(12) United States Patent
Drane et al.

(10) Patent No.: US 7,511,231 B2
(45) Date of Patent: Mar. 31, 2009

(54) ILLUMINATED RECESSED ELECTRICAL FLOOR BOX WITH TRANSPARENT OR TRANSLUCENT COVER OR WINDOW

(75) Inventors: Mark R. Drane, Germantown, TN (US); Robert K. Jolly, Cordova, TN (US)

(73) Assignee: Thomas & Betts International, Inc., Wilmington, DE (US)

(*) Notice: Subject to any disclaimer, the term of this patent is extended or adjusted under 35 U.S.C. 154(b) by 246 days.

(21) Appl. No.: 11/484,956

(22) Filed: Jul. 12, 2006

(65) Prior Publication Data

US 2007/0014102 A1 Jan. 18, 2007

Related U.S. Application Data

(60) Provisional application No. 60/699,770, filed on Jul. 15, 2005.

(51) Int. Cl.
*H02G 3/08* (2006.01)
*F21S 8/00* (2006.01)

(52) U.S. Cl. .................. 174/483; 174/484; 174/482; 220/3.2; 220/3.3; 362/153

(58) Field of Classification Search .......... 174/480, 174/481, 50, 53, 57, 58, 482–486, 490; 220/3.2–3.9, 220/4.02; 362/632, 153, 95, 145; 439/535–538; 248/906
See application file for complete search history.

(56) References Cited

U.S. PATENT DOCUMENTS

| | | | |
|---|---|---|---|
| 3,739,226 A * | 6/1973 | Seiter et al. .................. 174/53 |
| 4,000,405 A * | 12/1976 | Horwinski .................. 362/95 |
| 4,546,419 A * | 10/1985 | Johnson .................. 362/95 |
| 4,907,139 A | 3/1990 | Quiogue |
| 4,915,638 A | 4/1990 | Domian |
| 5,095,412 A | 3/1992 | French |
| 5,156,454 A | 10/1992 | White |
| 5,343,375 A | 8/1994 | Gross et al. |
| 5,796,037 A * | 8/1998 | Young et al. .................. 174/50 |
| 5,833,350 A * | 11/1998 | Moreland .................. 362/95 |
| 5,908,236 A | 6/1999 | Lueken et al. |
| 5,908,263 A | 6/1999 | Conners et al. |
| 6,042,256 A | 3/2000 | Gothard |
| 6,423,900 B1 | 7/2002 | Soules |
| 6,444,906 B1 * | 9/2002 | Lewis .................. 174/53 |
| 6,457,843 B1 * | 10/2002 | Kester et al. .................. 362/95 |
| 6,547,411 B1 * | 4/2003 | Dornbusch .................. 362/95 |
| 6,808,283 B2 | 10/2004 | Tsao |
| 7,205,488 B2 * | 4/2007 | Riner .................. 174/50 |
| 7,227,080 B2 * | 6/2007 | Kregle et al. .................. 174/50 |
| 2004/0150984 A1 | 8/2004 | Robertson et al. |

* cited by examiner

*Primary Examiner*—Angel R Estrada
(74) *Attorney, Agent, or Firm*—Hoffmann & Baron, LLP

(57) ABSTRACT

A lighted floor box having a transparent or translucent cover extending over a light source within the floor box. This light source illuminates the interior of the floor box while the cover permits such light to exit the box. The light source is preferably powered via the same cables that power an electrical fixture within the floor box. Furthermore, such light transmissible cover enables a user to inspect the interior of the floor box without the need to open the cover of the box in order to view its contents.

18 Claims, 6 Drawing Sheets

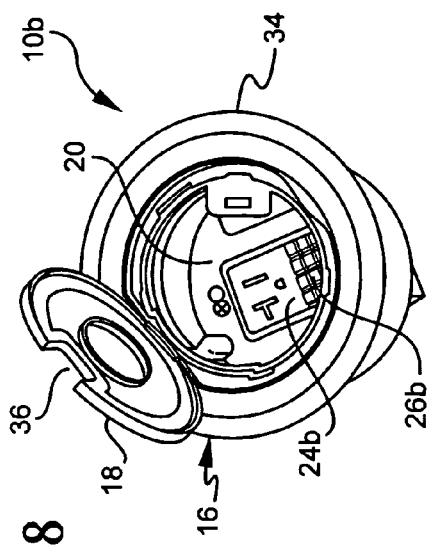
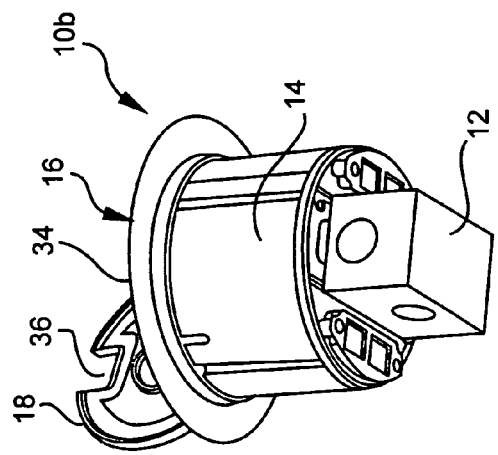
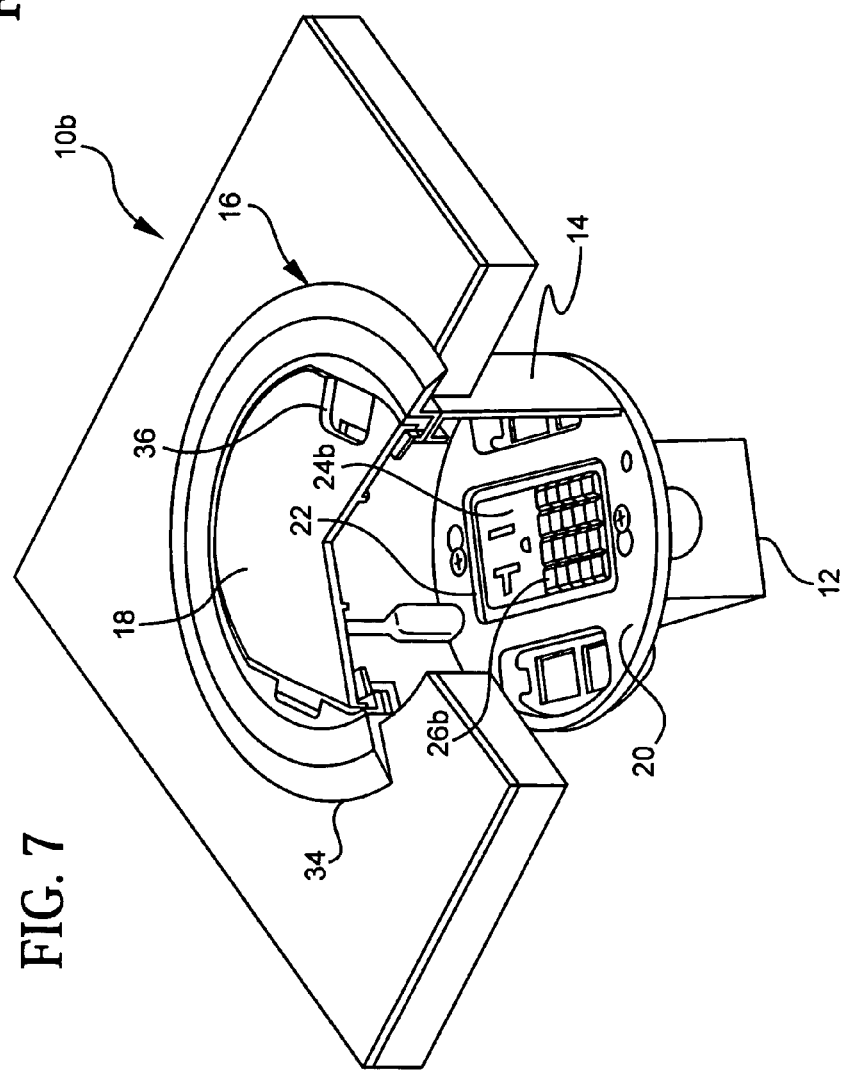

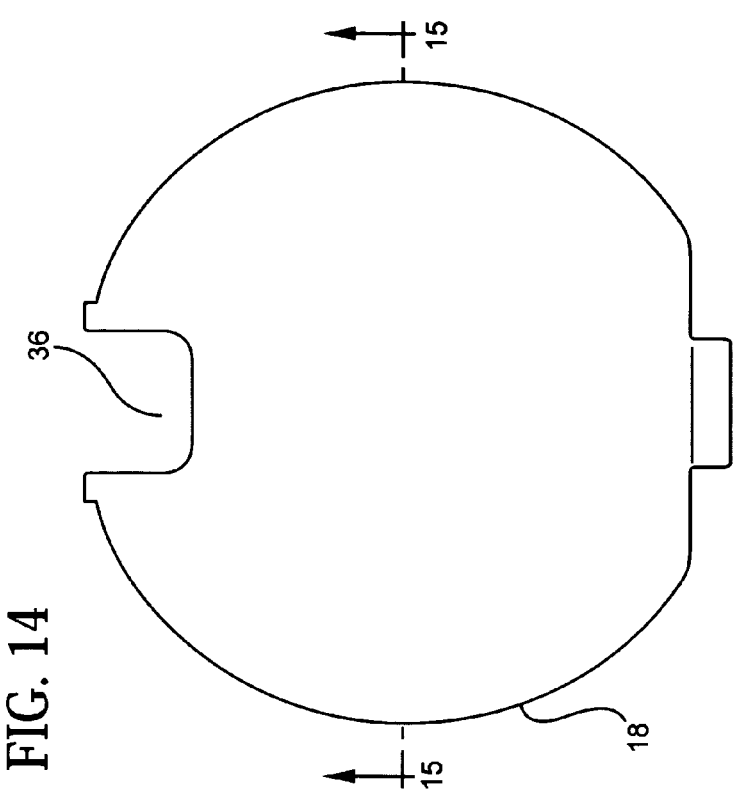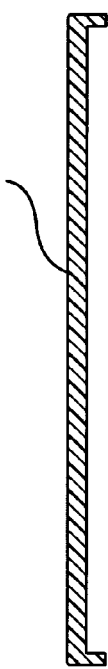
FIG. 14
FIG. 15
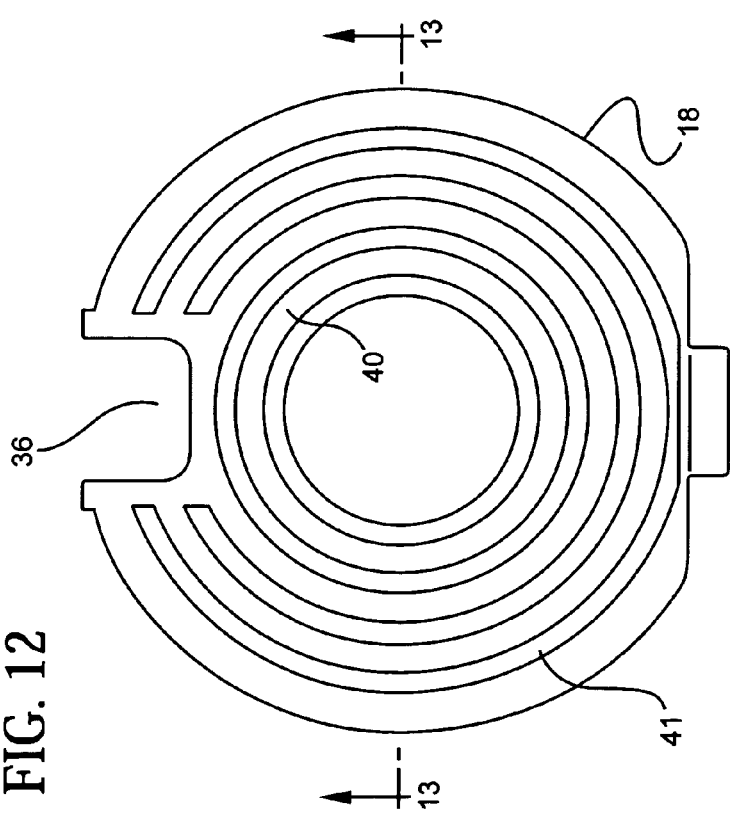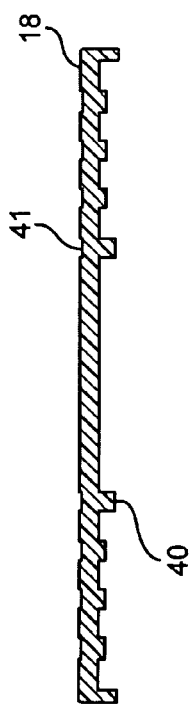
FIG. 12
FIG. 13

ILLUMINATED RECESSED ELECTRICAL FLOOR BOX WITH TRANSPARENT OR TRANSLUCENT COVER OR WINDOW

CROSS-REFERENCE TO RELATED APPLICATIONS

This application claims the benefit of U.S. Provisional Application No. 60/699,770, filed on Jul. 15, 2005.

FIELD OF THE INVENTION

This invention pertains to electrical outlet boxes in general and more particularly to an illuminated floor box having a transparent or translucent cover for both inspection and location purposes.

BACKGROUND OF THE INVENTION

Floor boxes are commonly used in buildings to provide power or data in areas that are not readily serviced by other means, such as wall boxes. Floor boxes are generally placed in areas away from wall boxes and more towards the open center of the floor where no wall or other support structure occurs. Because floor boxes are generally located in closer proximity to the device or devices they service, they eliminate wire or cords extending across the floor to the more traditional wall boxes. Obviously, while cords or cabling do also extend from a floor box, such floor boxes are generally arranged so that no such cabling need pass across main traffic aisles as is often the case when there are only wall boxes providing such service. Hence, to some degree, floor boxes help eliminate tripping hazards.

During daylight hours, such floor boxes in the open area of a floor and the cabling extending therefrom are readily seen as they generally contrast quite starkly with the floor material. At night however when lights are low, it may be more difficult to visually ascertain where the floor boxes and cabling are located. Hence, even the short run of cabling associated with floor boxes can create a tripping hazard.

It is thus desirable to provide a means of visually indicating where floor boxes are located even under low lighting conditions so that personnel can take appropriate precaution when near them. Further, the illumination of floor boxes serves double duty as a sort of "night light" by providing a limited source of area lighting. Also, illuminated floor boxes provide a point of reference during periods of low visibility such as when the room is smoke-filled because the light source is located in the floor and not the ceiling. Such floor reference points can be used to aid personnel in the proper evacuation of a building when normal visibility levels do not exist.

Additionally, it is common for data connectors to include a small LED therein that indicates when data is either being received or transmitted. It is also common for power connectors to have a small indicator light that informs the potential user that this receptacle is "hot". In traditional floor boxes, the only way to view these indicator lights is to lift the lid and peer inside. When there are a large number of such boxes to inspect, this becomes a time-consuming task. Hence, it is a purpose of this invention to enable an inspector to readily view the inside of the floor box without having to actually pivot or move the lid into the open position.

These and other objects and advantages of this invention will become obvious upon further review and investigation.

SUMMARY OF THE INVENTION

The present invention is a lighted floor box which includes an electrical outlet box that is sized and shaped to receive an electrical fixture or a data receptacle therein. A cover plate extends over this electrical outlet box with the cover plate having at least one opening that is sized to accommodate the electrical fixture. A pivotable cover extends over this floor box with the cover being shaped and configured to permit both light to pass therethrough and a wire or cord to extend out of the floor box. Also included within the floor box is a light source intermediate the cover and the electrical outlet box.

In a preferred embodiment, the floor box further includes a finished floor covering adapted to be mounted substantially flush with a floor, wherein the pivotable cover is hingedly attached to the covering. The box further preferably includes a transition tube intermediate the cover and the electrical outlet box. Thus, the light source can be configured to extend at least partially along the transition tube. In an alternative embodiment, the cover plate is formed with at least one light opening which is sized to accommodate the light source therein.

The pivotable cover can be designed to selectively block or unblock a wire access when pivoted with respect to the outlet box. Moreover, the pivotable cover can include a first opaque component and a second transparent or translucent component. In another embodiment, the pivotable cover includes a series of concentric grooves and ridges formed therein, wherein the grooves and ridges have alternating textured and polished surfaces for enhancing light transmission through the cover.

A preferred form of the illuminated floor box, as well as other embodiments, objects, features and advantages of this invention, will be apparent from the following detailed description of illustrative embodiments thereof, which is to be read in conjunction with the accompanying drawings.

BRIEF DESCRIPTION OF THE DRAWINGS

FIG. 7 is a cut-away perspective view of the upper side of yet another embodiment of an illuminated floor box.

FIG. 8 is a top perspective view of the embodiment of FIG. 7 illustrating a cord extending from the box.

FIG. 9 is a bottom perspective view of the embodiment of FIG. 7.

FIG. 12 is a top plan view of an alternative embodiment of the cover.

FIG. 13 is a cross-sectional view of the cover shown in FIG. 12 taken along the line 13-13.

FIG. 14 is a top plan view of another alternative embodiment of the cover.

FIG. 15 is a cross-sectional view of the cover shown in FIG. 14 taken along the line 15-15.

DETAILED DESCRIPTION OF THE PREFERRED EMBODIMENTS

Figure 2:
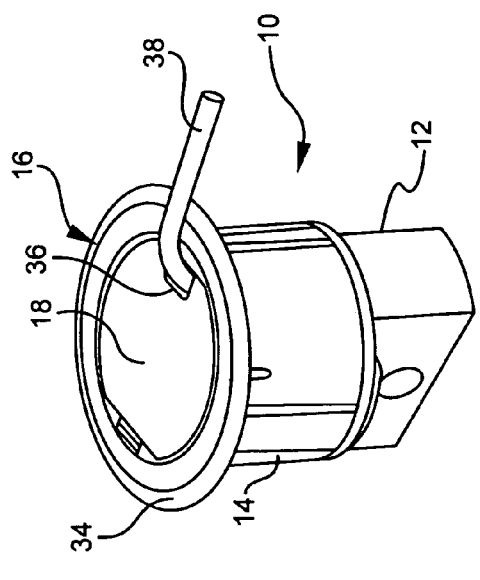
FIG. 2 is a top perspective view of the embodiment of FIG. 1 illustrating a cord extending from the box.
Figure 3:
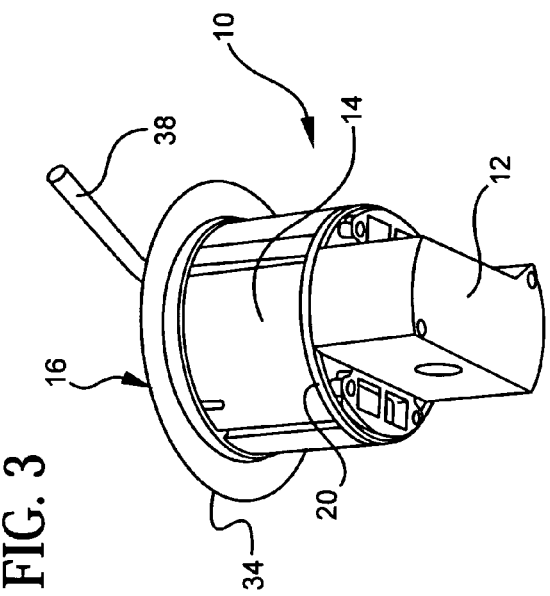
FIG. 3 is a bottom perspective view of the embodiment of FIG. 1.
Figure 1:
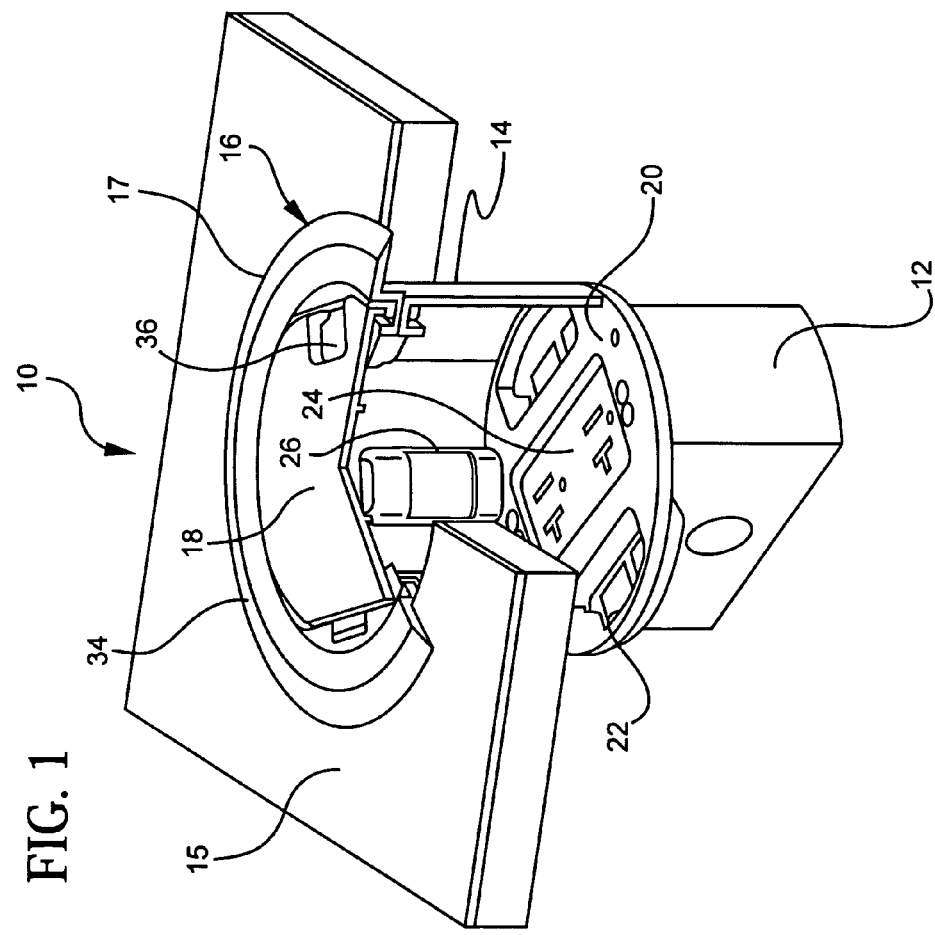
FIG. 1 is a cut-away perspective view of the upper side of one embodiment of an illuminated floor box.

Referring initially to FIGS. 1-3, there is shown one embodiment of an illuminated floor box 10 of the present invention mounted within a floor 15. While a floor box for mounting within a floor of a structure is shown and described herein, it is conceivable to incorporate the illumination feature of the present invention in other electrical outlet boxes, such as wall boxes and ceiling boxes.

The floor box 10 shown in FIGS. 1-3 comprises a sub-floor box 12 coupled to a transition tube 14 which, in turn, is secured to a finished floor covering 16. Covering 16 includes a hinged cover 18 for permitting access to the interior of the floor box 10.

The covering 16 is generally in the form of a rim adapted to be mounted substantially flush with the finished floor 15. In this regard, the cover 16 preferably includes an outer peripheral ramp portion 17, which provides a smooth transition between the floor 15 and the top of the floor box to prevent a person from tripping on the box.

Cover 18 of finished floor covering 16 is preferably transparent or translucent so that the illumination of the interior of floor box 10 may pass therethrough. In this regard, the cover 18 is preferably molded from a transparent or translucent plastic material, such as clear polycarbonate or a similar polymer. Cover 18 operates in a normal fashion by being pivotable between a first open position providing access to the interior of floor box 10 and a second closed position sealing off the interior of the box.

Sub-floor box 12 may be of metal or plastic construction and it may be integral with transition tube 14 or it may be separately attachable thereto, such as a typical electrical outlet box might be. In either event, a cover plate 20 is provided between the sub-floor box 12 and the transition tube 14. The cover plate 20 can be placed over the open sub-floor box 12 and attached to either the box 12 or the transition tube 14. Alternatively, cover plate 20 may form an integral part of the transition tube 14 or the sub-floor box 12. Cover plate 20 is configured with typical openings 22 therein to accept one or more of a variety of different data and/or power fixtures 24 which include duplex, GFCI, round, switch and data jacks. For example, the cover plate 20 shown in FIGS. 1-3 includes an arrangement of openings 22 which allows two data plates to be mounted on opposite sides of a standard decorator style receptacle 24.

The transition tube 14 defines a recessed area above the electrical outlet 24 and/or data panels to accommodate the plugs of the electrical and/or data wires entering the box 10 and inserted into respective receptacles below floor level. Also, the length or height of transition tube 14 is selected primarily based on the thickness of the floor. Thus, in some cases, transition tube 14 may be longer than in others, but it is preferably not to be shorter than the height of the plug inserted within fixture 24 otherwise cover 18 could not be closed.

In the embodiment shown, a light source 26 is mounted within floor box 10 along transition tube 14. This light source 26 may include LEDs or it may contain another light emitting device as the illumination source. No matter the type, light source 26 would preferably have its leads secured to the same power source as power fixture 24 within floor box 10.

Figure 11:
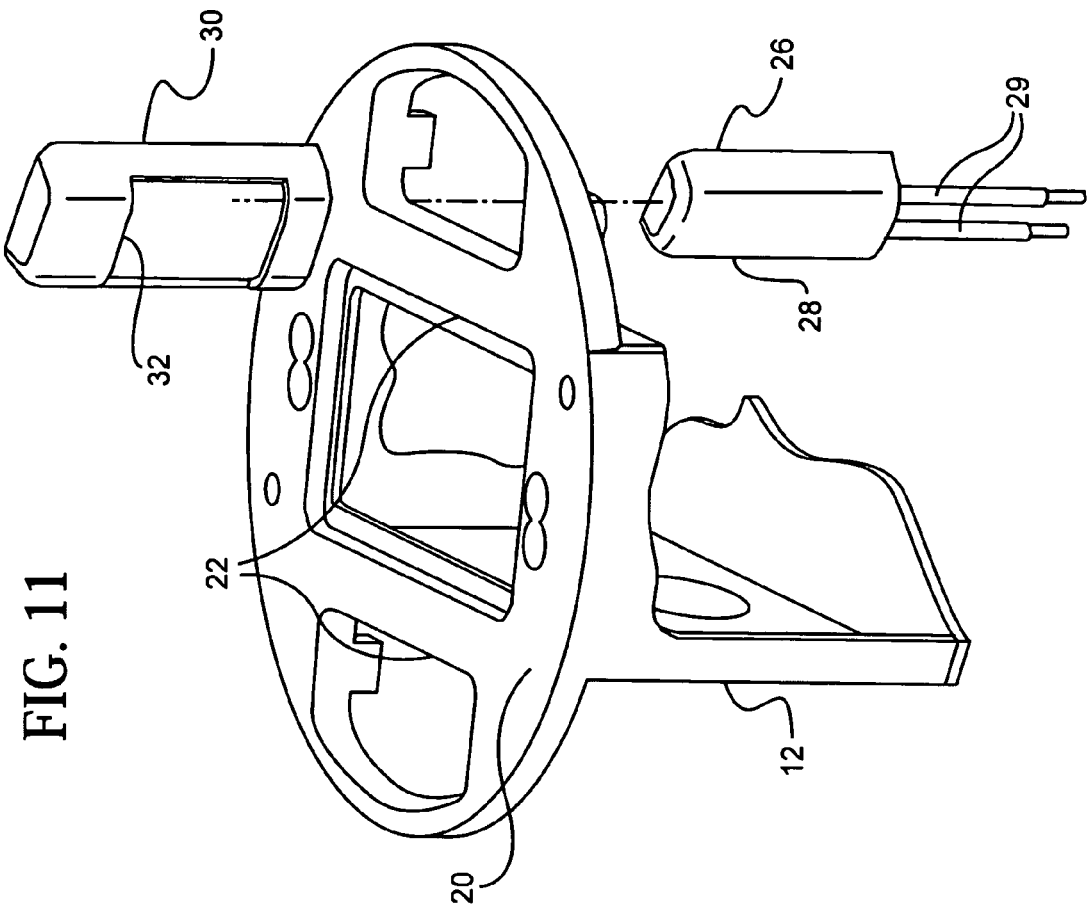
FIG. 11 is a perspective view of yet another light source usable in this invention.

Details of one light source 26 are shown in FIG. 11, wherein an LED 28 slides or is fitted within a light housing 30 located on the cover plate 20 or along an inside surface of transition tube 14. This housing 30 is in the form of a vertically oriented tower and can be attached to or formed integrally with the inside surface of the transition tube 14 and/or the cover plate 20. The light housing 30 is further provided with at least one lens (not shown) or other opening 32 therein to permit the light from the light source 26 to shine therethrough. FIG. 11 further illustrates the various leads associated with LED 28 which would be connected to the wiring running to power fixture 24 in center opening 22.

Due to cover 18 allowing light to pass therethrough (i.e. transparent or translucent), light source 26 not only illuminates the interior of box 10, but also the area above and around box 10 as well. It is this illumination both within and outside box 10 that permits a user to readily see such devices so that box 10 and any cords extending therefrom can either be located if that is what is desired or they can be avoided if need be.

Further, the transparent or translucent nature of cover 18 also permits visual inspection of the power and data connectors within floor box 10 without the need to open the box itself. Such visual inspection is especially needed should the power or data connectors within floor box 10 be of the type that includes one or more indicators or other visual device that signals whether they are active or not. These light or other visual sources, while not designed for illumination purposes, are designed to be seen and thus the advantage of light transmissible cover 18 of the present invention which allows such sources to be viewed without the need to open such cover for such inspection to occur.

Returning to FIGS. 1-3, the rim 34 of finished floor covering 16 is preferably made of metal for strength and rigidity in order to provide support to cover 18. Transparent or translucent cover 18 is also preferably pivotable in at least one direction that it can be selectively operated to open or close (seal) a cord entryway or access opening 36 through which a wire 38 passes. Finished floor covering 16 is also designed to comply with industry code regarding scrub-water resistance so that only the allowed amount of scrub-water is permitted to enter box 10 from the outside.

Figure 5:
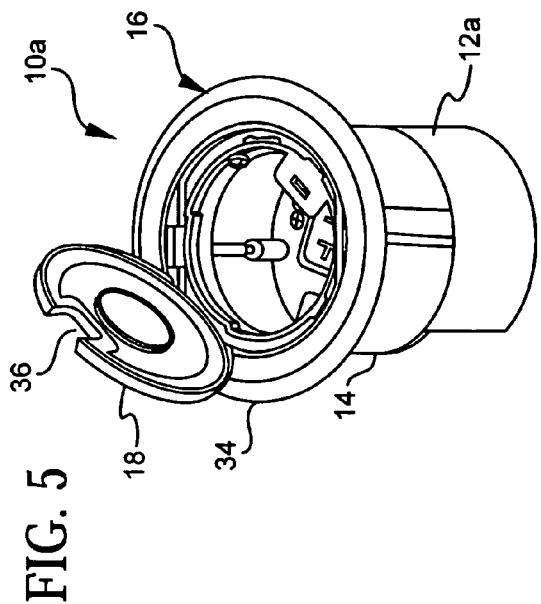
FIG. 5 is a top perspective view of the embodiment of FIG. 4.
Figure 6:
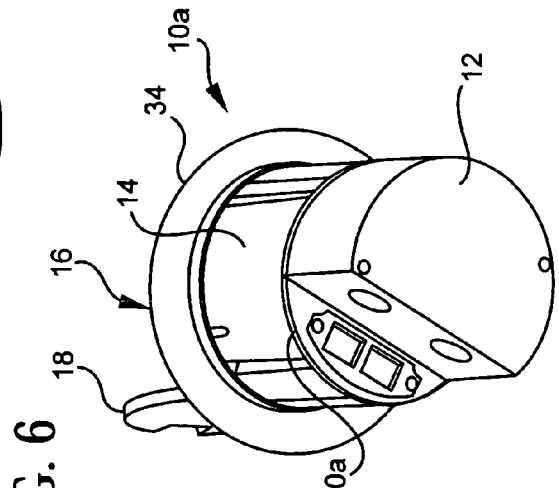
FIG. 6 is a bottom perspective view of the embodiment of FIG. 4.
Figure 4:
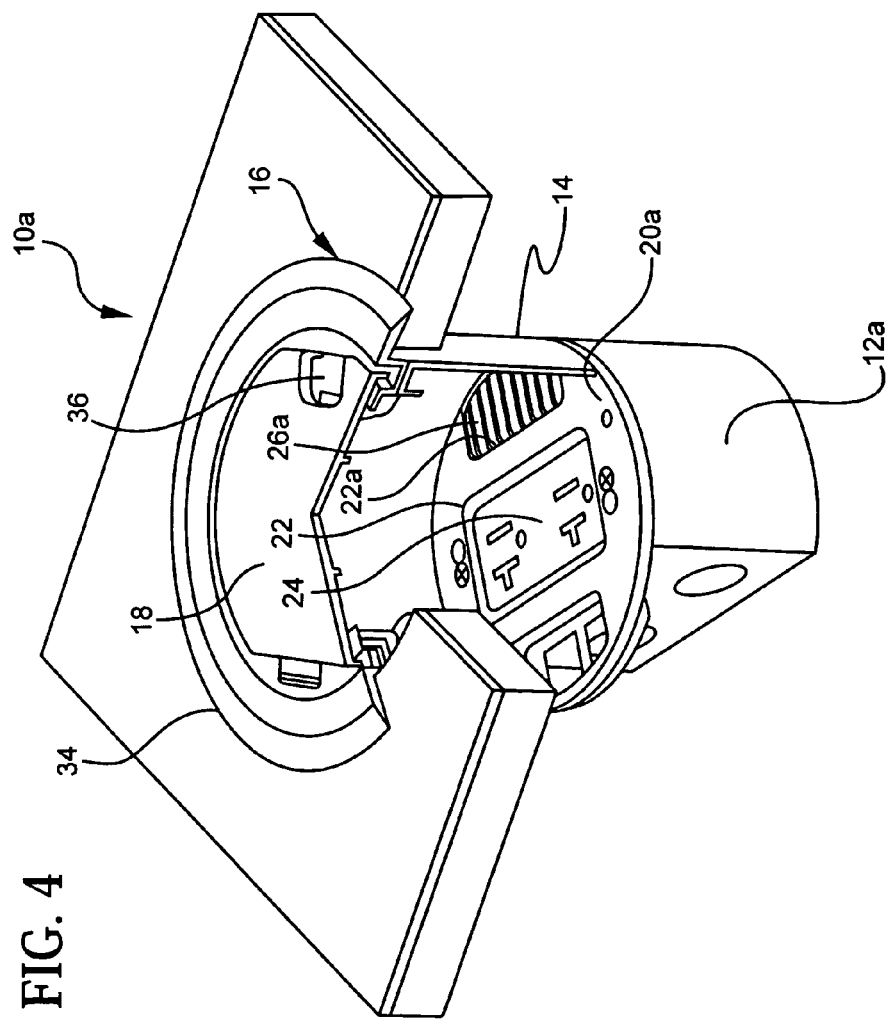
FIG. 4 is a cut-away perspective view of the upper side of another embodiment of an illuminated floor box.
Figure 10:
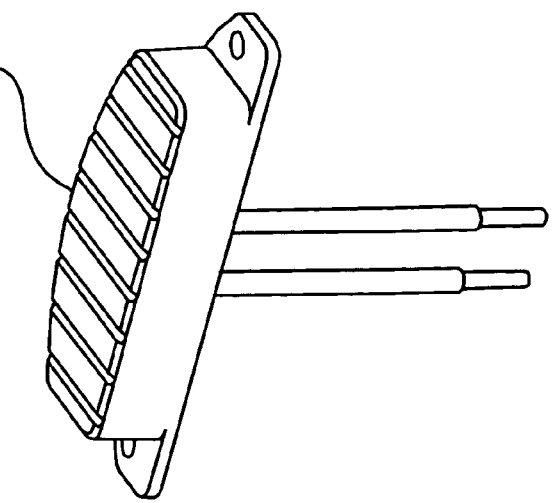
FIG. 10 is a perspective view of one light source usable in this invention.

Whereas FIGS. 1-3 illustrate the light source 26 as being mounted to or extending along transition tube 14, the embodiment 10a shown in FIGS. 4-6 illustrate a light source 26a as emanating from a cover plate 20a and shining upwardly. For this version, the cover plate 20a would contain an opening 22a designed to accommodate this bottom light source 26a. Also, sub-floor box 12a would be constructed differently than the version previously described so as to accommodate this new light source 26a. In a preferred embodiment, this light source 26a includes an upper light emitting surface, which is mounted flush with the top surface of the cover plate 20a. As further shown in these figures, there is still sufficient space within box 10a for both data and power receptacles in addition to this bottom light source 26a. This light source 26a utilized in the embodiment 10a shown in FIGS. 4-6 is shown in greater detail in FIG. 10.

FIGS. 7-9 illustrate yet another embodiment 10*b* of the invention. This embodiment employs a decorator style receptacle 24*b* having its own integral light source 26*b*. Hence, no further wiring or assembly is required as both the power fixture and the light source are one and the same. However, a clear or translucent cover 18 is still a necessity if more than the interior of box 10 is to be illuminated. As also shown in these FIGS. 7-9, a typical single gang box can be employed as sub-floor box 12.

FIGS. 12-15 illustrate various alternative designs for the cover 18. The cover 18 shown in FIGS. 12-13 includes a series of concentric ridges 40 and grooves 41. Alternating polished and textured surfaces on adjacent ridges 40 and grooves 41 can be provided to enhance illumination of the cover 18. For example, an appropriate combination of textured ridges 40 and polished grooves 41 can be selected to cause the cover 18 to act as a lens, directing, focusing or diffusing the light emanating from within as desired.

The cover 18 shown in FIGS. 14-15 is planar and can include a textured surface to produce a translucent cover, or the surface can be polished to produce a transparent cover. Additionally, various color tinting can be utilized with the cover 18 for other desired lighting effects.

Figure 18:
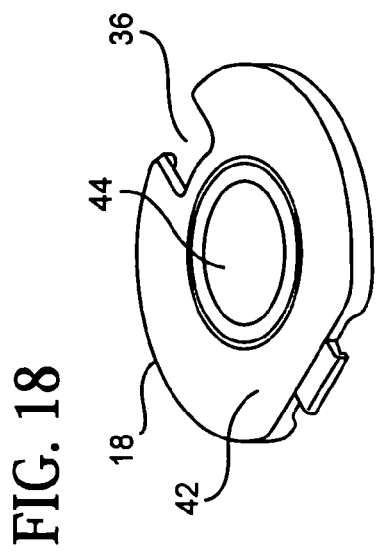
FIG. 18 is a top perspective view of the cover shown in FIG. 16.
Figure 16:
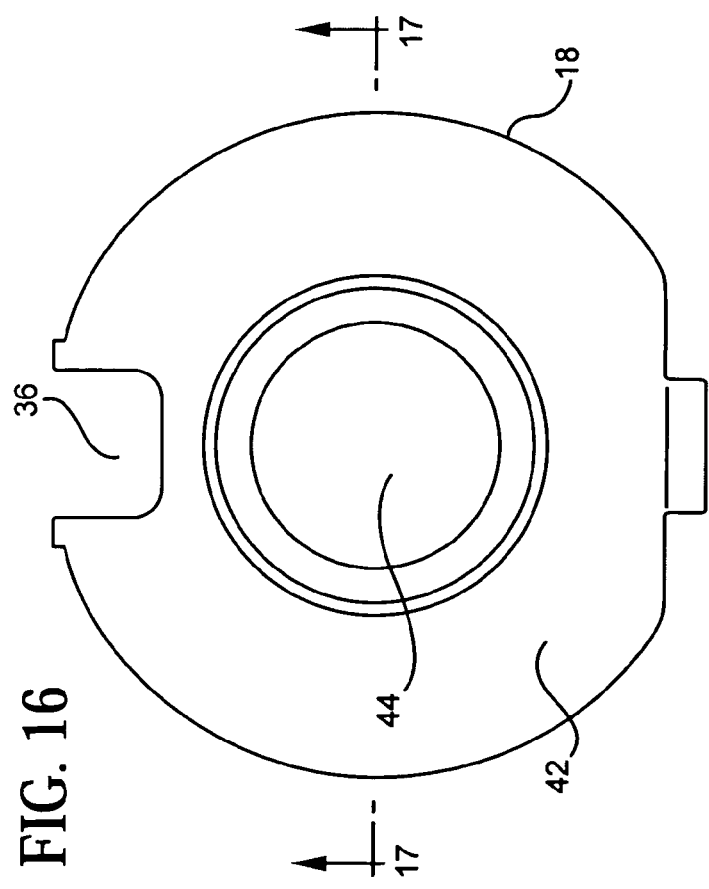
FIG. 16 is a top plan view of still another alternative embodiment of the cover.
Figure 17:
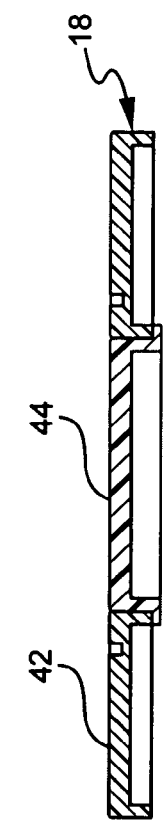
FIG. 17 is a cross-sectional view of the cover shown in FIG. 16 taken along the line 17-17.

In another embodiment, the cover 18 may consist of two separate pieces, as shown in FIGS. 16-18, with an opaque outer component 42 and a concentric transparent or translucent center component 44. The outer component 42 can be made from a metallic or non-metallic material. In the case of a non-metallic material, the outer portion 42 can be textured to be opaque. The center component 44 is preferably made from a transparent or translucent plastic material, such as clear polycarbonate or a similar polymer, so as to act like a lens. Here too, the center component 44 can be textured or be provided with colored tinting to provide any desired lighting effect. It is even possible to emboss a logo or a symbol on the center component 44, (or the cover 18 shown in any of the other embodiments described above), if so desired.

While select preferred embodiments of this invention have been illustrated, many modifications may occur to those skilled in the art and therefore it is to be understood that these modifications are incorporated within these embodiments as fully as if they were fully illustrated and described herein.

What is claimed is:

1. A receptacle box comprising:
    (a) an electrical outlet box sized and shaped to receive a power or data receptacle therein,
    (b) a cover plate disposed over said electrical outlet box, said cover plate configured with at least one opening sized to accommodate said power or data receptacle;
    (c) a pivotable cover extending over the electrical outlet box, said cover being light transmissible thereby allowing light to pass therethrough;
    (d) a light source intermediate said pivotable cover and said electrical outlet box, and
    (e) a transition tube disposed between said cover plate of said electrical outlet box and said pivotable cover, said transition tube defining a recessed area between said cover plate and said pivotable cover for accommodating wire plugs.

2. A receptacle box as set forth in claim 1 further comprising at least one light opening in said cover plate sized to accommodate said light source therein.

3. A receptacle box as set forth in claim 1 wherein said light source extends at least partially along said transition tube.

4. A receptacle box as set forth in claim 1 wherein said pivotable cover pivots to selectively block or unblock a wire access port.

5. A receptacle box as set forth in claim 1 further comprising at least one data opening in said cover plate sized to accommodate at least one data port therein.

6. A receptacle box as set forth in claim 1 wherein said cover comprises a first opaque component and a second transparent or translucent component.

7. A receptacle box as set forth in claim 1, wherein said electrical outlet box is adapted to be mounted in a floor structure.

8. A receptacle box comprising:
    (a) an electrical outlet box sized and shaped to receive a power or data receptacle therein,
    (b) a cover plate disposed over said electrical outlet box, said cover plate configured with at least one opening sized to accommodate said power or data receptacle;
    (c) a pivotable cover extending over the electrical outlet box, said cover being light transmissible thereby allowing light to pass therethrough; and,
    (d) a light source intermediate said pivotable cover and said electrical outlet box, wherein said cover includes a series of concentric grooves and ridges formed therein, one of said grooves and ridges having a textured surface and the other of said grooves and ridges having a polished surface for enhancing light transmission through said cover.

9. A receptacle box comprising:
    (a) an electrical outlet box sized and shaped to receive a power or data receptacle therein,
    (b) a cover plate disposed over said electrical outlet box, said cover plate configured with at least one opening sized to accommodate said power or data receptacle;
    (c) a pivotable cover extending over the electrical outlet box, said cover being light transmissible thereby allowing light to pass therethrough;
    (d) a light source intermediate said pivotable cover and said electrical outlet box; and,
    (e) a finished floor covering adapted to be mounted substantially flush with a floor, said pivotable cover being hingedly attached to said covering.

10. A receptacle box comprising:
    (a) a housing sized and shaped to receive an electrical fixture therein,
    (b) a pivotable cover extending over said housing, said cover configured with a wire access port that is selectively blocked or unblocked, said cover also being constructed of a transparent or translucent material thereby allowing light to pass therethrough;
    (c) a visual indicator within said housing viewable through said cover, and
    (d) a transition tube disposed between said housing and said pivotable cover, said transition tube defining a recessed area between said housing and said pivotable cover for accommodating wire plugs.

11. A receptacle box as set forth in claim 10, further comprising a cover plate having at least one opening therein, said cover plate extending over said housing.

12. A receptacle box as set forth in claim 10 wherein said visual indicator emits light along an internal surface of said transition tube.

13. A receptacle box as set forth in claim 11 further comprising at least one data opening in said cover plate sized to accommodate at least one data port therein.

14. A receptacle box as set forth in claim 10 wherein said cover comprises a first opaque component and a second light transmissible component.

15. A receptacle box as set forth in claim 10 wherein said visual indicator comprises a light source.

16. A receptacle box as set forth in claim 10, wherein said housing is adapted to be mounted in a floor structure.

17. A receptacle box comprising:
   (a) a housing sized and shaped to receive an electrical fixture therein,
   (b) a pivotable cover extending over said housing, said cover configured with a wire access port that is selectively blocked or unblocked, said cover also being constructed of a transparent or translucent material thereby allowing light to pass therethrough; and
   (c) a visual indicator within said housing viewable through said cover,
   wherein said cover includes a series of concentric grooves and ridges formed therein, one of said grooves and ridges having a textured surface and the other of said grooves and ridges having a polished surface for enhancing light transmission through said cover.

18. A receptacle box comprising:
   (a) a housing sized and shaped to receive an electrical fixture therein,
   (b) a pivotable cover extending over said housing, said cover configured with a wire access port that is selectively blocked or unblocked, said cover also being constructed of a transparent or translucent material thereby allowing light to pass therethrough;
   (c) a visual indicator within said housing viewable through said cover; and
   (d) a finished floor covering adapted to be mounted substantially flush with a floor, said pivotable cover being hingedly attached to said covering.

* * * * *